(12) United States Patent
Schreckenberger et al.

(10) Patent No.: US 10,898,833 B2
(45) Date of Patent: Jan. 26, 2021

(54) FILTER DEVICE, IN PARTICULAR LIQUID FILTER

(71) Applicant: MANN+HUMMEL GMBH, Ludwigsburg (DE)

(72) Inventors: Dieter Schreckenberger, Erdmannhausen (DE); Christian Thalmann, Speyer (DE); Robert Hasenfratz, Waiblingen (DE); Fabian Wagner, Moeglingen (DE); Frank Pflueger, Sachsenheim (DE); André Roesgen, Remshalden (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 15/390,661

(22) Filed: Dec. 26, 2016

(65) Prior Publication Data

US 2017/0120166 A1    May 4, 2017

Related U.S. Application Data

(63) Continuation of application No. PCT/EP2015/064045, filed on Jun. 23, 2015.

(30) Foreign Application Priority Data

Jun. 27, 2014  (DE) .......................... 10 2014 009 327

(51) Int. Cl.
| | | |
|---|---|---|
| *B01D 27/10* | (2006.01) | |
| *F02M 37/32* | (2019.01) | |
| *F02M 37/46* | (2019.01) | |
| *F02M 37/48* | (2019.01) | |
| *B01D 35/00* | (2006.01) | |
| *B01D 36/00* | (2006.01) | |
| *B01D 27/08* | (2006.01) | |
| *F02M 37/54* | (2019.01) | |
| *B01D 29/31* | (2006.01) | |
| *B01D 29/88* | (2006.01) | |

(Continued)

(52) U.S. Cl.
CPC .......... *B01D 27/106* (2013.01); *B01D 27/08* (2013.01); *B01D 35/005* (2013.01); *B01D 36/001* (2013.01); *F02M 37/32* (2019.01); *F02M 37/46* (2019.01); *F02M 37/48* (2019.01); *B01D 2201/347* (2013.01); *B01D 2201/4015* (2013.01); *F02M 37/54* (2019.01)

(58) Field of Classification Search
None
See application file for complete search history.

(56) References Cited

U.S. PATENT DOCUMENTS 2,979,208 A    4/1961  Humbert
3,682,320 A    8/1972  Holyoak
(Continued)

FOREIGN PATENT DOCUMENTS

DE    202008009502 U1    12/2009
WO        2012081983 A1     6/2012

*Primary Examiner* — Benjamin M Kurtz
(74) *Attorney, Agent, or Firm* — James Hasselbeck (57) ABSTRACT

A filter device includes in a filter housing a hollow cylindrical filter element having frontal end plates, a flow opening being made in one of the end plates. In order to interlockingly secure a pipe connection piece that communicates with the flow opening, a cover has a radial collar which forms an axial stop for the pipe connection piece.

14 Claims, 6 Drawing Sheets

(51) Int. Cl.
    *B01D 46/00*     (2006.01)
    *B01D 46/24*     (2006.01)
    *F02M 37/22*     (2019.01)

(56) References Cited

U.S. PATENT DOCUMENTS

| | | | | |
|---|---|---|---|---|
| 4,512,884 | A | * | 4/1985 | Wheatley ............ B01D 17/045 210/136 |
| 4,719,012 | A | * | 1/1988 | Groezinger ............ B01D 27/08 210/232 |
| 5,114,575 | A | * | 5/1992 | Yano ...................... B01D 27/08 96/209 |
| 5,269,571 | A | | 12/1993 | Haggard |
| 5,336,406 | A | | 8/1994 | Stanford |
| 2007/0102336 | A1 | * | 5/2007 | Komine ................ B01D 29/21 210/232 |
| 2007/0108119 | A1 | * | 5/2007 | Mandt ................... B01D 27/08 210/424 |
| 2013/0043181 | A1 | | 2/2013 | Krull |
| 2015/0273371 | A1 | * | 10/2015 | Morris .................. B01D 35/30 55/495 |

\* cited by examiner

FILTER DEVICE, IN PARTICULAR LIQUID FILTER

TECHNICAL FIELD

The invention relates to a filter device, especially a fluid filter, according to the preamble to claim 1.

BACKGROUND

EP 2 110 539 A2 describes a filter device for diesel fuel, which device has a ring-shaped filter element in a pot-shaped filter housing, the fuel to be filtered flowing through the filter element radially from the outside to the inside. The filter element has an end disc on each of its axial end faces. The unfiltered fuel is supplied in the region of a first axial end face via a heating module that is flange-mounted to a cover of the filter housing and is retained using a connector. Inserted in the heating module is a feed pipe for connecting to a fuel line, the fuel being conducted on the opposing side of the heating module via another pipe to the radially outwardly disposed unfiltered side of the filter element. A central fitting on the heating module projects into the clean area through an opening in the end disk; the central fitting is part of a pressure gauge device via which it is possible to measure the differential pressure between the unfiltered side and the filtered side. The filtered fluid is conducted away via the end disk of the filter element axially opposing the heating module.

SUMMARY

The underlying object of the invention is to join a pipe connecting piece to a filter device in a structurally simple manner.

The inventive filter device or cartridge is preferably used for filtering fluids, especially for filtering fuel such as, for instance, diesel fuel. In principle, however, it may also be used for filtering gaseous fluids.

In a filter housing the filter device has a hollow cylindrical or annular filter element through which the fluid to be filtered flows radially from the outside to the inside. At each of its two axial end faces the filter element has an end disk, a flow opening into which a pipe connecting piece may be inserted being added to at least one end disk. When the flow direction is radially from outside to inside, the interior forms the filtered side via which the filtered fluid may be conducted away axially via the flow opening and the pipe connector part.

The filter housing also has a cover that closes the open side of the filter housing with the filter element accommodated therein. The pipe connecting piece is attached to the cover in a positive fit. For this, the cover or a component joined to the cover has a radially oriented collar—relative to the longitudinal filter axis—that, when mounted, forms an axial stop for the pipe connecting piece. This positive fit securing and retention of the pipe connecting piece on the cover represents an easy-to-assemble, easy-to-produce connection that can be released easily so that if necessary the filter device may be exchanged and a new filter device may be connected to the existing pipe connecting piece. The positive fit is axial, and the pipe connecting piece is mounted axially on the filter device.

In one preferred embodiment, cover and filter housing are permanently joined to one another, for instance by welding, soldering, beading, or gluing. Thus a disposable filter that is simple to exchange is embodied that may in particular be connected to a filter head or an inventive pipe connecting piece.

Embodiments having a radially inwardly oriented and a radially outwardly oriented collar on the cover may both be considered. What is essential is that a dedicated connection segment axially engages the collar at the pipe connecting piece. For assembly, pipe connecting piece and filter device are moved axially towards one another until the connection segment axially engages the collar in the desired manner, whereupon the positive fit is produced using a radial adjusting motion between pipe connecting piece and filter device, that is, transverse to the longitudinal filter axis.

According to a preferred embodiment, however, it is also possible to produce the positive fit between pipe connecting piece and collar on the cover of the filter device using a latch that may be inserted into a positive fit pocket on the connection segment, which positive fit pocket is arranged between the radially oriented collar and the connection segment on the pipe connecting piece. The insertion direction for the latch is especially transverse to the longitudinal filter axis, that is, radial, as well. The latch in the positive fit pocket is disposed axially between the collar and a component on the connection segment of the pipe connecting piece and prevents axial removal between pipe connecting piece and filter device, so that the pipe connecting piece is secured to the filter device in a positive fit.

The latch is embodied, for instance, in a U shape and is inserted radially into its locking position through a recess in the wall of the connection segment delimiting the positive fit pocket, in which position axial detachment of the pipe connecting piece from the cover is prevented. However, also possible is a rectangular embodiment of the latch, which is also inserted radially into a recess in the wall of the positive fit pocket and projects into the positive fit pocket.

The collar is either embodied integrally with the cover or separately therefrom, but is preferably joined to the cover such that it cannot be lost or detached, for instance by welding, soldering, beading, or gluing. The cover comprises metal, for instance; the collar may also be embodied as metal component. In a different embodiment, the collar is joined to the cover using beading, for instance, or is soldered to the cover. When cover and collar are embodied integrally, latter is produced by master forming or radially bending an axial segment of the cover.

According to another useful embodiment, especially radially offset to the positive fit pocket the filter device has a sealing pocket that receives a sealing element on the cover. The sealing pocket is axially delimited by the collar or a cover segment and hereby axially secures the inserted sealing element in a positive fit. The sealing element may be embodied as a sealing ring that is retained on the cover, for instance that is placed onto a fitting on the cover. The sealing element separates the unfiltered side from the filtered side of the filter element.

According to another useful embodiment, the collar is spaced apart from the cover on the outside of the latter. This may be realized in that provided on the cover is a pipe-shaped, especially flow-guiding, projection, and on its end spaced apart from the cover the collar is arranged. Spaced apart from the cover shall be construed to mean that the cover has a cover surface that closes the housing and from which the collar, which may certainly also be a part of the cover, is spaced. Due to this, further preferably an especially radially outwardly open annular engagement area for a latch may be formed between cover and collar, wherein particularly preferably the sealing pocket is arranged axially at a height between collar and cover and thus radially within the engagement area. Because of the arrangement of the seal in the immediate vicinity of the collar, at which the positive fit connection may occur, changes in the shape of the individual parts in the area of the seal, which changes are caused by vibrations, are so small that the risk of vibration-induced leaks is reduced.

The sealing pocket for receiving the sealing element may be arranged offset radially inward opposing the positive fit pocket. With respect to the longitudinal filter axis, axially offset arrangements of sealing pocket and positive fit pocket and arrangements of sealing pocket and positive fit pocket at the same axial height are both possible. Where necessary, embodiments in which the sealing pocket is arranged offset radially outward to the positive fit pocket are also possible.

The sealing pocket may be axially delimited using a delimiting part that, according to another advantageous embodiment, is embodied separately from the collar and is also arranged on the cover. In some aspects of the invention, integral embodiment of the delimiting part and the collar is provided. The delimiting part may comprise the same material as the collar and may be joined to the cover like the collar, for instance using soldering. Integral embodiment of the delimiting part and the cover is also possible.

A centering element that receives the pipe connecting piece may be inserted into the end disk of the filter element. A sealing element is advantageously inserted between pipe connecting piece and centering element in order to provide a flow-tight connection between the centering element and the pipe connecting piece.

According to another advantageous embodiment, the unfiltered fluid is supplied and the filtered fluid is conducted away via the same axial end face of the filter element or via the cover. Also possible are embodiments in which a pipe connecting piece has a common housing for a supply channel for supplying unfiltered fluid and a discharge channel for conducting the filtered fluid away. In one advantageous embodiment, supply channel and discharge channel are disposed coaxially in that one channel radially surrounds the other channel, the channels being separated from one another flow-tight in order to prevent an undesired exchange of unfiltered and filtered fluid. For instance, the radially interiorly disposed channel may form the discharge channel for conducting filtered fluid away and the surrounding channel having a larger diameter may be the supply channel for supplying the unfiltered fluid.

However, a parallel offset arrangement of supply and discharge channel in a common housing of a pipe connecting piece may also be considered. Moreover, embodiments are possible in which two pipe connecting pieces are arranged disposed adjacent to one another on the cover, the pipe connecting pieces being embodied independently of one another.

According to another advantageous embodiment, a non-return valve may be integrated in the pipe connecting piece. The non-return valve prevents undesired outflow of fluid that is still in the pipe connecting piece when the pipe connecting piece detaches from the filter device. If a non-return valve is also arranged in the supply channel, the non-return valve prevents uncontrolled discharge of unfiltered fluid when the pipe connecting piece detaches from the filter device.

BRIEF DESCRIPTION OF THE DRAWINGS

Additional advantages and useful embodiments may be found in the other claims, the description of the figures, and the drawings.

In the drawings, like components are assigned like reference signs.

DETAILED DESCRIPTION

Each of the figures depicts a filter device 1 that is embodied as a fluid filter for filtering fuel, for instance diesel fuel. In the exemplary embodiment according to FIGS. 1 through 3, the filter device 1 has a pot-shaped filter housing 2 that is for receiving an annular or hollow cylindrical filter element 3 and through which the fluid to be filtered flows radially from the outside to the inside. The interior 4 in the filter element 3 consequently forms the filtered side, the radially outwardly disposed surface forms the unfiltered side on the filter element. The axial end faces of the filter element 3 are closed by end disks 5 and 6. Adjacent to the upper end disk 5, which has a central flow opening, a pipe connecting piece 7 having a supply channel 8 for supplying unfiltered fluid and a discharge channel 9 for conveying away filtered fluid may be attached to the filter device 1. The pipe connecting piece 7 may be attached to a cover 10, which is placed onto the open side of the pot-shaped filter housing 2. The cover 10 is securely connected to the filter housing.

Figure 1:
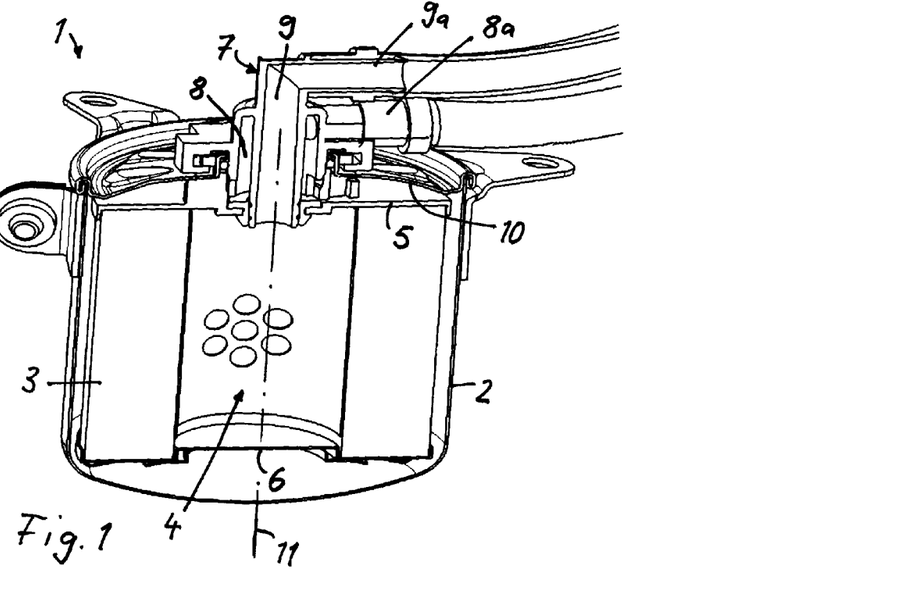
FIG. 1 depicts a fluid filter having an annular or hollow cylindrical filter element in a filter housing, on which a cover is placed and on which a pipe connecting piece is retained in a positive fit.

The discharge channel 9 of the pipe connecting piece 7 projects into the central flow opening in the end disk 5 on the filter element 3 and communicates with the interior 4, in which the filtered fluid collects. The filtered fluid is thus conveyed out of the interior 4 via the central flow opening in the end disk 5 and via the discharge channel 9 in the pipe connecting piece 7.

The pipe connecting piece 7 is embodied as a dual connector having a common housing for the supply channel 8 and the discharge channel 9. Supply channel 8 and discharge channel 9 are arranged concentric to one another, wherein the supply channel 8 has a larger diameter than the discharge channel 9 and surrounds the latter. The channels 8, 9 are connected to tubes for supplying and conveying away the fluid via connecting elements 8a and 9a.

The unfiltered fluid is supplied via the connecting element 8a and the supply channel 8 to the radially outwardly disposed surface of the filter element 3, through which fluid to be filtered flows radially from the outside to the inside. As described in the foregoing, the fluid is conveyed away from the interior 4 axially via the discharge channel 9 and the connecting element 9a and further via the connected tube.

Figure 2:
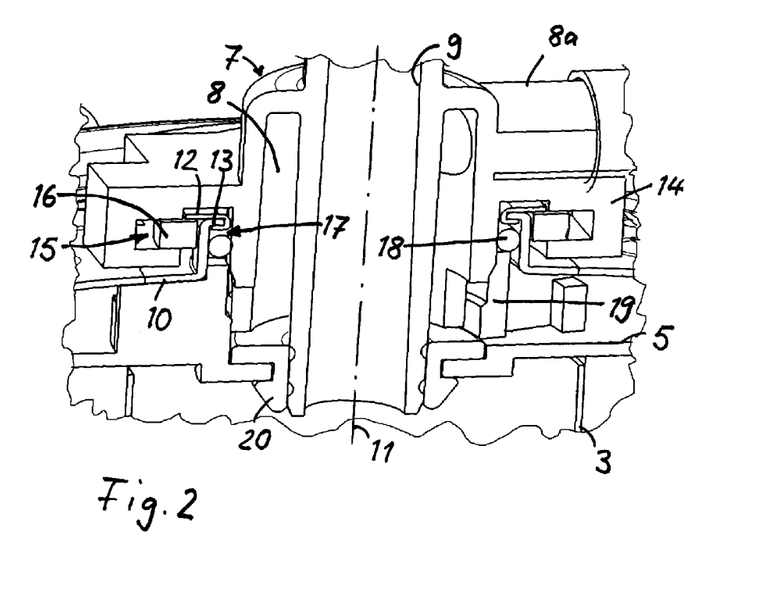
FIG. 2 depicts an enlarged detail from the area of the positive fit attachment of the pipe connecting piece to the cover.
Figure 3:
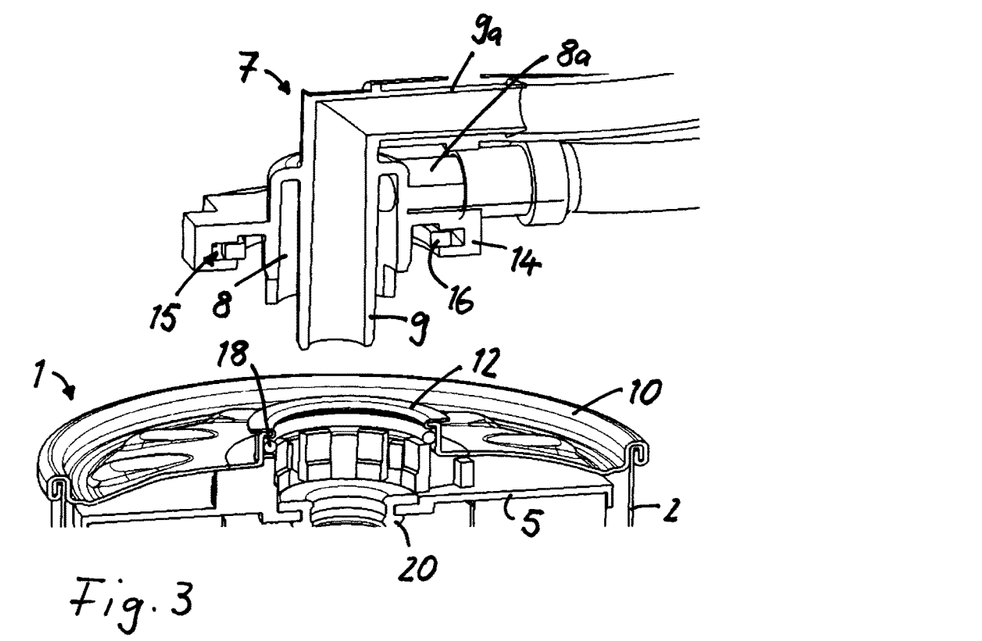
FIG. 3 depicts cover and pipe connecting piece, detached.
Figure 4:
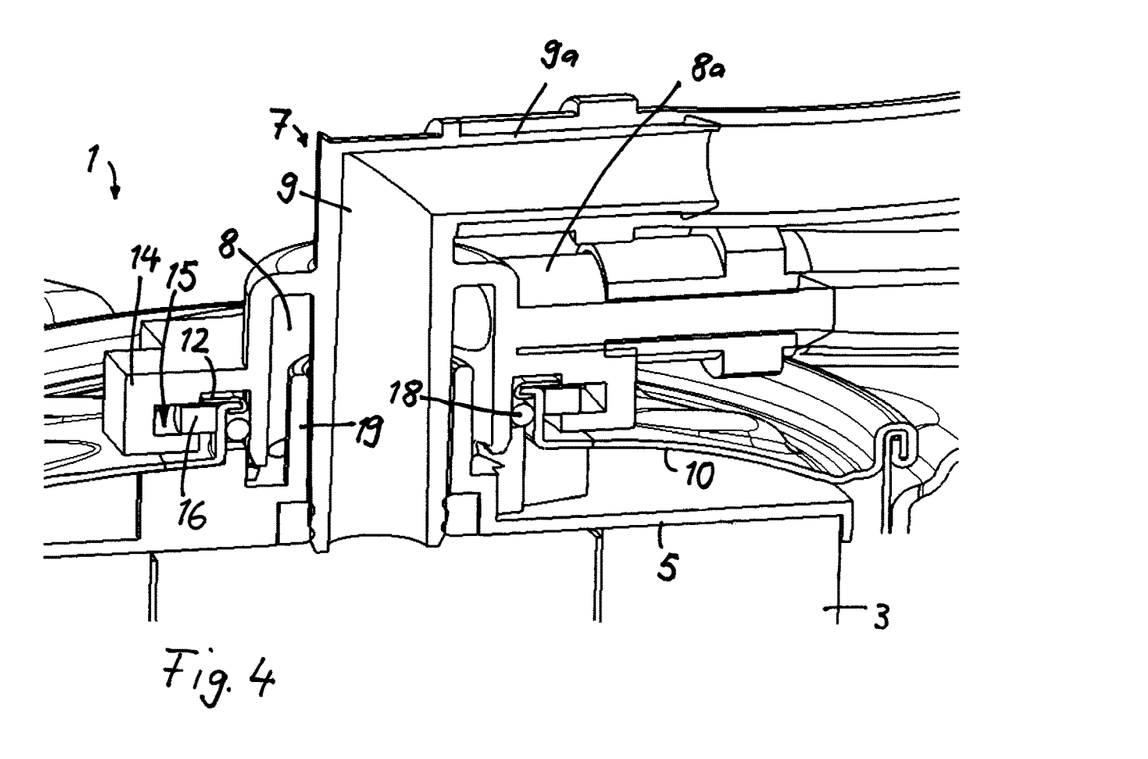
FIG. 4 depicts, in a variant, a connection between pipe connecting piece and cover.

The pipe connecting piece 7 is embodied separately from the filter device 1 and is retained on the cover 10 in a positive fit. The positive fit is effected in the direction of the longitudinal filter axis 11 via a curved collar 12 (FIGS. 2, 3), which is embodied separately from the cover 10 but is connected to the cover 10. Added to the cover 10 is a central opening for receiving the pipe connecting piece 7, wherein a radially inwardly curved delimiting segment 13 is molded on the wall delimiting the central opening on the cover 10 and bears the collar 12 that extends radially outward. The collar 12 may be attached by beading the delimiting segment 13 on cover 10. As shown in FIGS. 2, 3 and 4, the collar 12 is arranged on an axially outer surface of the delimiting segment 13 of the cover 10.

A connecting segment 14 is embodied integrally with the housing of the pipe connecting piece 7 and houses a positive fit pocket 15, the connecting segment 14 axially surrounding the radially outwardly oriented collar 12. In order to produce an axially positive fit connection between the pipe connecting piece 7 and the cover 10, a latch 16 is inserted into the positive fit pocket 15 in the connecting segment 14 and engages the radially outwardly oriented segment of the collar 12 according to FIG. 2. At the same time, the latch 16 is retained by the U shaped walls of the connecting segment 14. The latch 16 is embodied, for instance, in a U shape and is inserted via transversely extending recesses in the wall of the connecting segment 14 until it reaches the axially positive fit position. Then the pipe connecting piece 7 is retained on the cover 10 axially in a positive fit.

The radially inwardly oriented delimiting segment 13 on the cover 10 also delimits a sealing pocket 17 into which a sealing ring 18 retained on the cover 10 is inserted. In the opposing direction, the sealing ring 18 is axially supported by a centering element 19 that is arranged on the end disk 5 and into which the pipe connecting piece 7 may be inserted. The sealing pocket 17 is disposed axially at about the same height as the positive fit pocket 15, but offset radially inwardly relative to the positive fit pocket 15.

Another sealing element 20 is disposed on the central flow opening that is added to the end disk 5, the discharge channel 9 being positioned against the annular sealing element 20.

In FIG. 4, the axial positive fit connection between the pipe connecting piece 7 and the cover 10 is the same as in the first exemplary embodiment according to FIGS. 1 through 3.

However, in FIG. 4 the centering element 19, which is embodied integrally with the end disk 5, is embodied positioned directly against the outer wall of the discharge channel 9, while in FIGS. 1 through 3 the centering element is arranged spaced radially apart from the discharge channel 9. The axial support of the sealing ring 18 in the sealing pocket is provided via a support element that is also advantageously embodied integrally with the end disk 5 or is arranged at the end disk. As shown in in FIG. 4, the centering element 19 (shown as a tubular projection) of the end disk 5 extends axially completely through the central opening of the cover 10.

Figure 5:
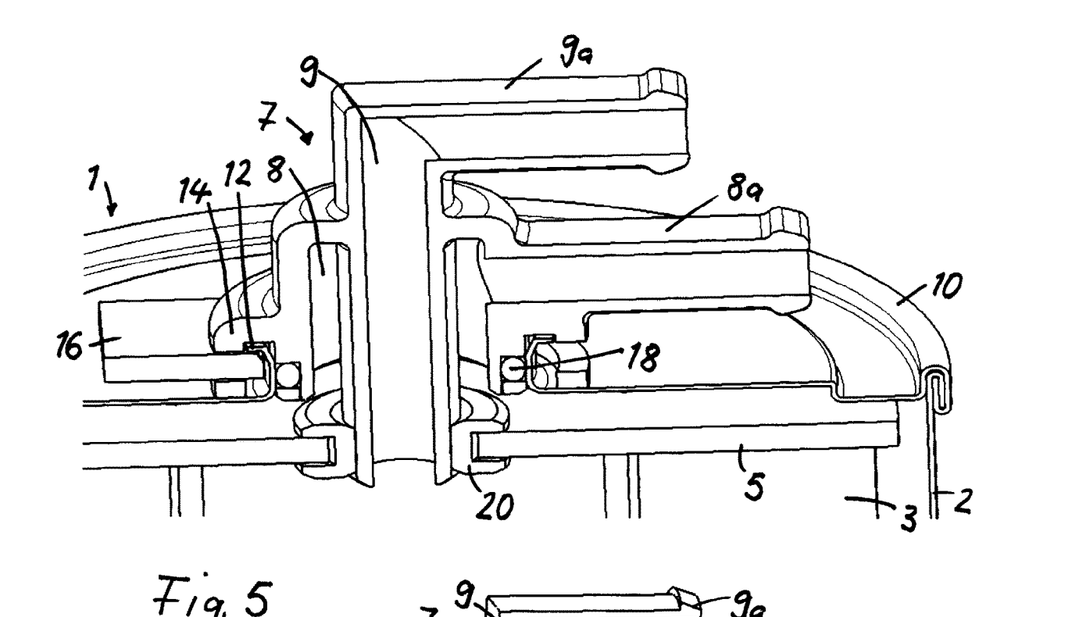
FIG. 5 depicts, in another variant, a pipe connecting piece in a positive fit connection with the cover.

In the exemplary embodiment according to FIG. 5, the collar 12 is embodied integrally with the cover 10. The collar 12 forms the radially outwardly curved end segment of the cover 10 in the area of the wall delimiting the central opening.

Added to the housing of the pipe connecting piece 7, in the area of the connecting segment 14, is a transversely extending opening into which is inserted a rectangularly embodied latch 16 gripped by the collar 12. This results in an axial positive fit connection between the pipe connecting piece 7 and the cover 10.

The axially extending wall of the cover 10, which wall delimits the central opening, forms a support for the sealing ring 18 radially outward.

Figure 6:
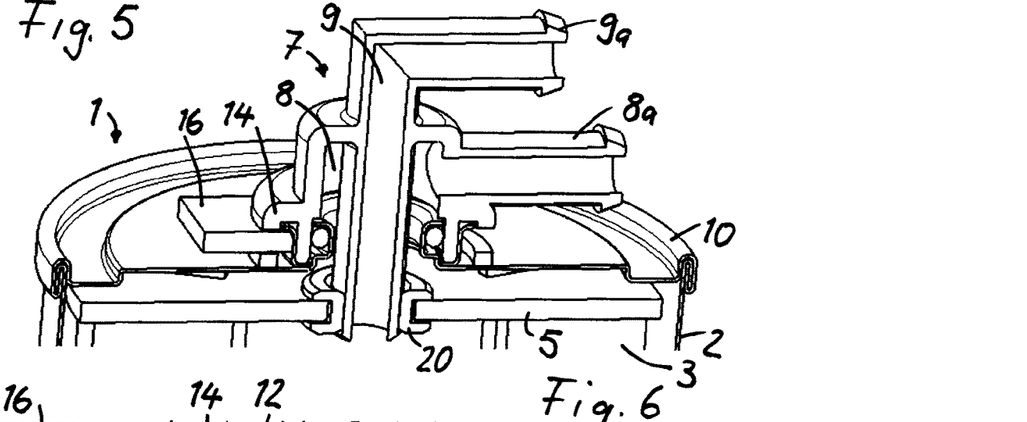
FIGS. 6, 7 depict other variants of pipe connecting piece and cover, FIG. 7 illustrating an enlarged detail from FIG. 6.
Figure 7:
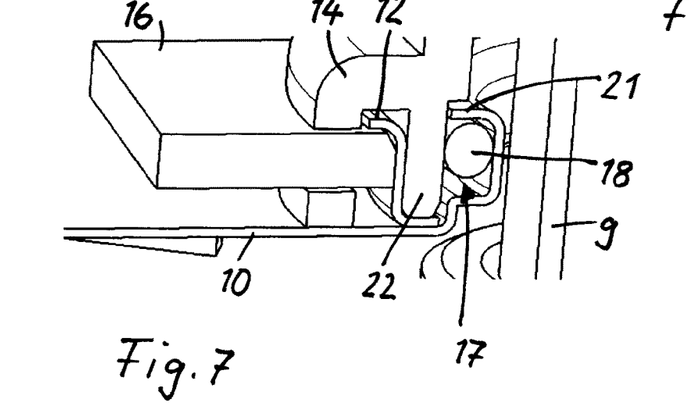

In the exemplary embodiment according to FIGS. 6 and 7, the collar 12 is embodied separately from the cover 10 and is joined to the cover 10 in a suitable manner, for instance by soldering. On its end facing the cover 10, the collar 12 has a radially outwardly curved segment that, when mounted, engages the transversely inserted rectangular latch 16.

The sealing pocket 17 for receiving the sealing ring 18 is engaged by a delimiting part 21 that is embodied integrally with the cover and forms the radially inwardly curved end segment in the area of the central opening in the cover. The delimiting part 21 is disposed offset radially inwardly relative to the collar 12. The sealing ring 18 is delimited radially outwardly by a wall 22 that is embodied integrally with the connecting segment 14 on the pipe connecting piece 7.

Figure 8:
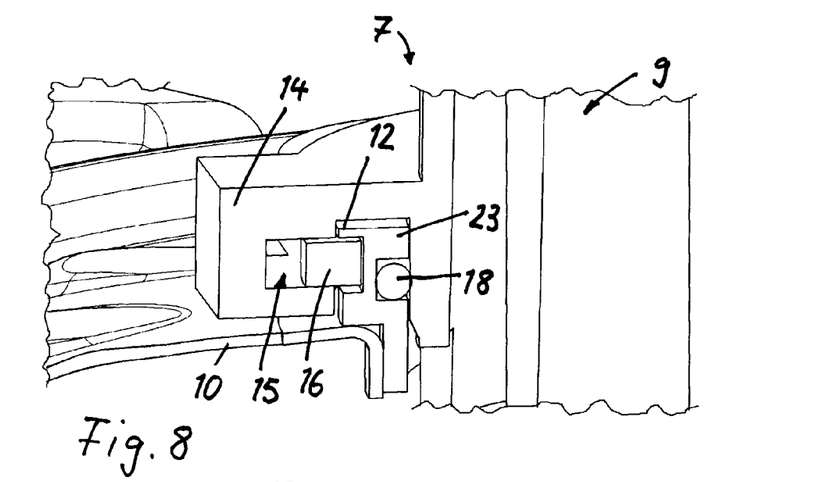
FIG. 8 depicts another variant of pipe connecting piece and cover.

In the exemplary embodiment according to FIG. 8, the collar 12 is oriented radially outward and is embodied integrally with a positive fit component 23 that is embodied separately from the cover 10, but is securely connected thereto. The positive fit component 23 with the radially outwardly oriented collar 12 for securing the inserted latch 16 and the connecting segment 14 in a positive fit delimits, radially inwardly, a sealing pocket for receiving the sealing ring 18.

Figure 9:
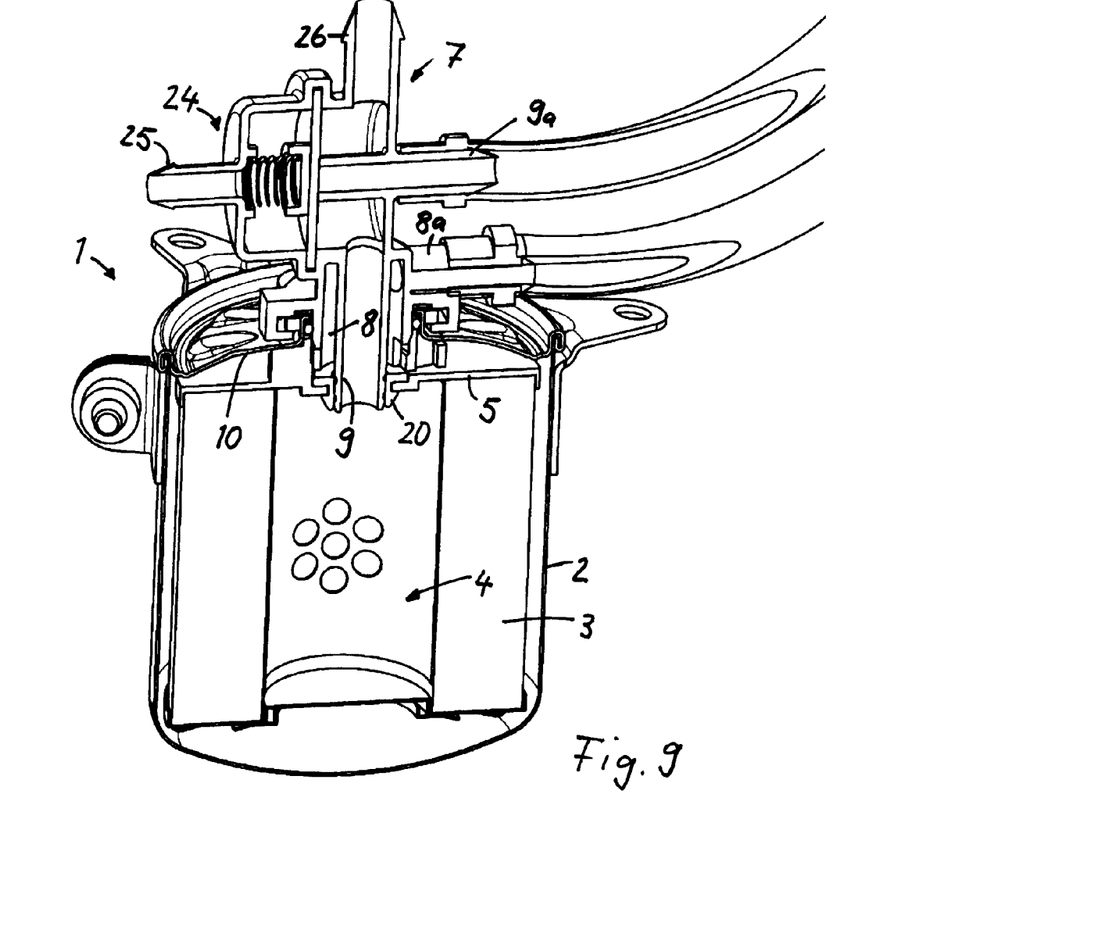
FIG. 9 depicts a fluid filter with integrated pressure control valve in the pipe connecting piece.

In the exemplary embodiment according to FIG. 9, the positive fit connection between the pipe connecting piece 7 and the cover 10 is embodied as in the first exemplary embodiment according to FIGS. 1 through 3. The pipe connecting piece 7 is also embodied as described in the foregoing as a dual connector with integrated supply channel 8 and discharge channel 9. In addition, the pipe connecting piece 7 is fitted with a pressure control valve 24 that keeps the system fuel pressure upstream of the injection valves at a constant value relative to the intake pressure (fuel differential pressure). Because of this, the injection quantity is dependent only on the actuation period for the injection valves and is reproducible under all operating conditions for the actuation period. Consequently the same quantity of fuel is injected per unit of time at all pressures.

The pressure control valve 24 is a bypass valve that releases, via a spring-loaded diaphragm, a return channel 26 for the fuel for refuelling when the set pressure is exceeded. The pressure control valve 24 has a negative pressure line to the intake (intake connector 25) so that the absolute fuel pressure may be altered proportionate to the intake pressure.

Figure 10:
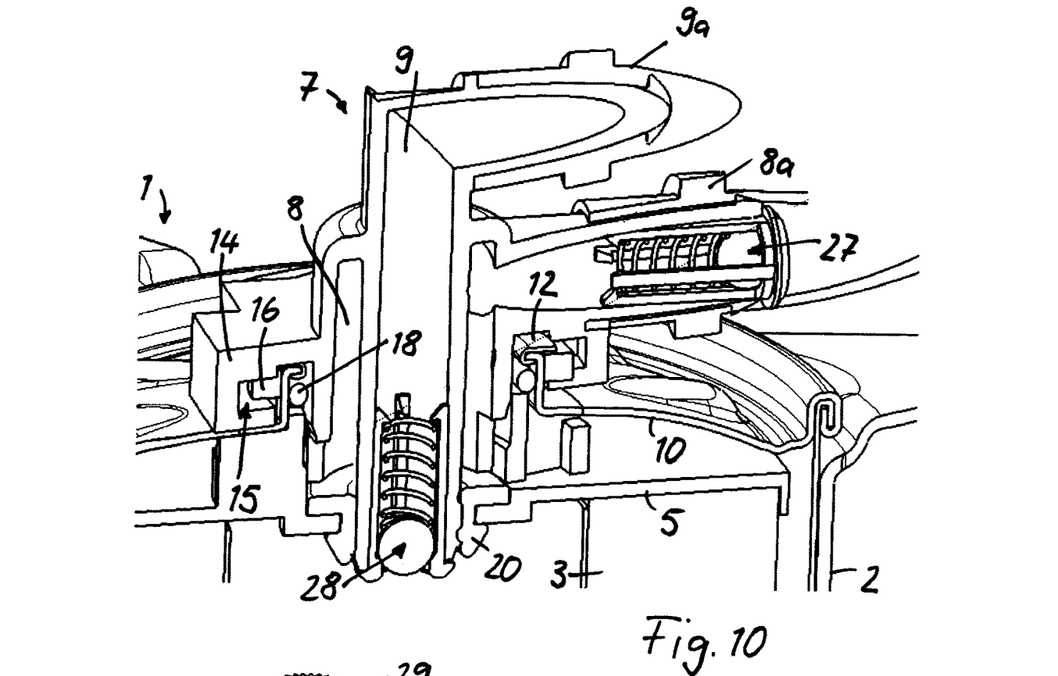
FIG. 10 depicts a fluid filter with integrated non-return valves in the pipe connecting piece, in which pipe connecting piece a supply channel and a discharge channel are arranged coaxially.

In the exemplary embodiment according to FIG. 10, non-return valves 27 and 28 are integrated in the supply channel 8 and discharge channel 9. The non-return valve 27 in the supply channel 8 is disposed in the area of the connecting element 8a, while the non-return valve 28 in the supply channel 9 is positioned directly at the end projecting into the interior of the filter element 3. The non-return valves 27, 28 open in the direction of the regular flow direction of the supply or discharge of unfiltered or filtered fluid and close in the opposing direction.

Figure 11:
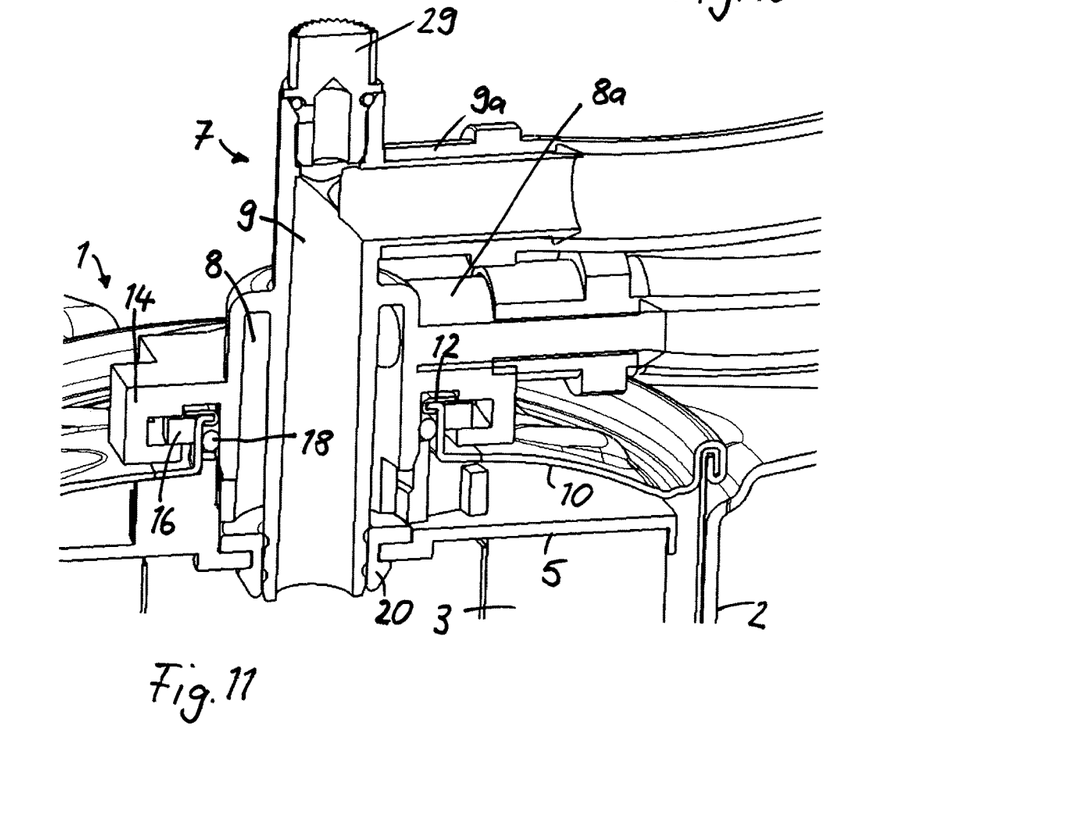
FIG. 11 depicts a fluid filter with integrated air vent screw in the pipe connector part.

In the exemplary embodiment according to FIG. 11, the pipe connecting piece 7 is fitted with an air vent screw 29 that is arranged in the area of the discharge channel 9.

Figure 12:
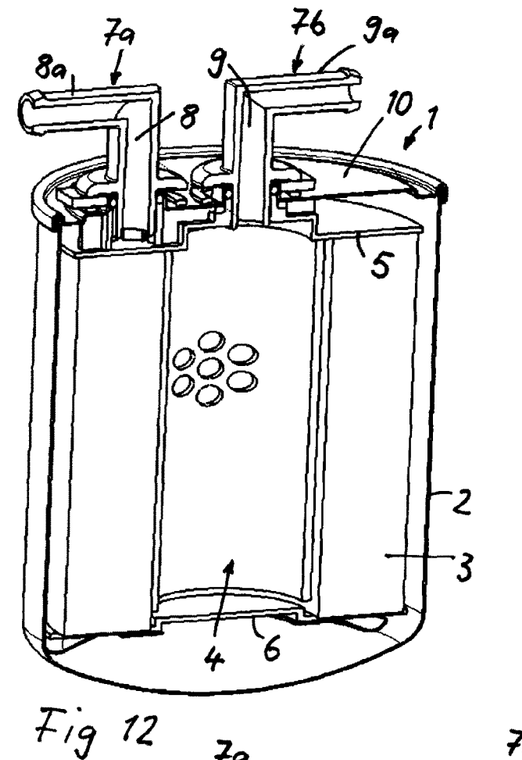
FIGS. 12 through 14 depict various views of a fluid filter having two separately embodied pipe connecting pieces for the supply and the discharge of the fluid.
Figure 13:
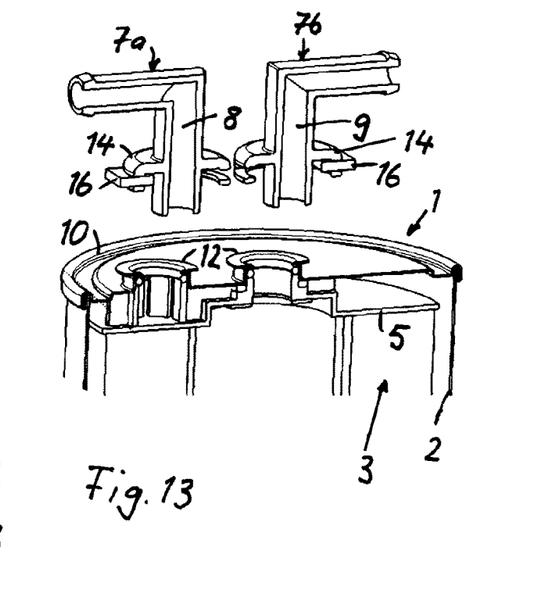
Figure 14:
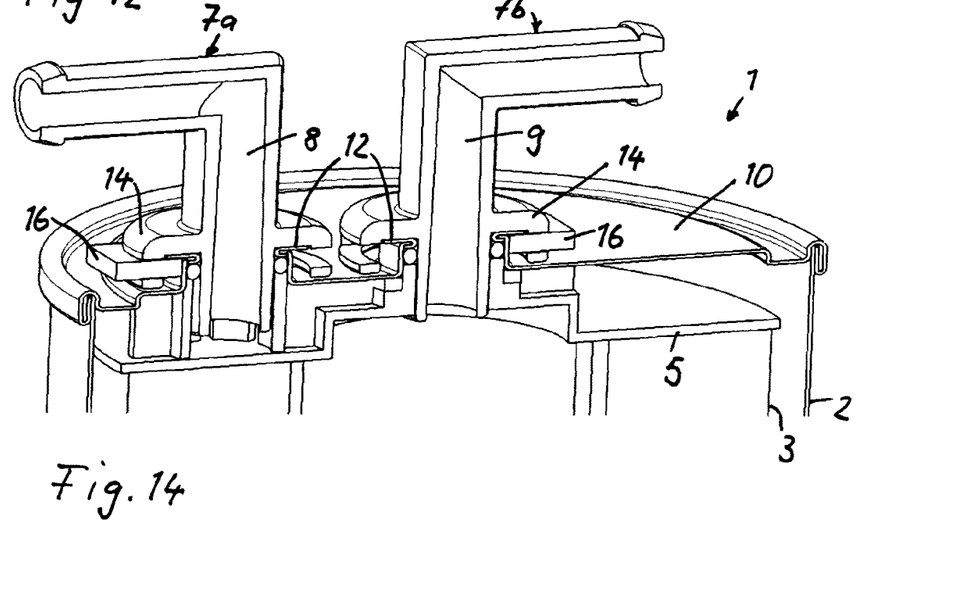

In the exemplary embodiment according to FIGS. 12 through 14, two separately embodied pipe connecting pieces 7a and 7b are provided that are both retained on the cover 10 in a positive fit. The first pipe connecting piece 7a has the supply channel 8, the second pipe connecting piece 7b has the discharge channel 9.

The pipe connector pieces 7a and 7b are arranged parallel to one another and are both retained on the cover 10 in the same manner in a positive fit. The pipe connecting piece 7b with the discharge channel 9 is arranged centrically, the pipe connecting piece 7a with the supply channel 8 is parallel and offset thereto. Two offset recesses, each for receiving a pipe connecting piece 7a or 7b, are correspondingly arranged offset in the cover 10.

The positive fit connection is effected in each case using the connecting segment 14 on the pipe connecting piece, to which a lateral opening is added for inserting the rectangular latch 16. When inserted, the latch 16 engages with the collar 12 (FIGS. 13, 14), which is embodied separately from the cover 10 but is joined to the cover 10 using beading.

What is claimed is:

1. A filter device for filtering a fluid, comprising:
    a filter housing;
    a cover arranged on the filter housing;
    a sealing element retained on the cover;
    a hollow cylindrical filter element inserted into an interior of the filter housing, the hollow cylindrical filter element including:
        a filter medium for filtering the fluid,
        end disks on opposing end faces of the filter medium, a first end disk of the end disks having a flow opening extending through the first end disk;
    an axially extending segment extending in a first axial direction from the cover, the axially extending segment delimiting a radially outward boundary of a sealing pocket, the sealing pocket receiving the sealing element;
    a radially inwardly oriented segment arranged on an axial outer end of the axially extending segment and extending radially inwardly over and delimiting the sealing pocket in the first axial direction;
    a radially outwardly oriented collar arranged on an axially outer surface of the radially inwardly oriented segment, the collar being arranged on an axially outer surface of the radially inwardly oriented segment and on an axially inner surface of the radially inwardly oriented segment to delimit the sealing pocket in the first axial direction and extending outwardly from the axially extending segment;
    a pipe connecting piece communicating with the flow opening, the pipe connecting piece defining a positive fit pocket for establishing an axially positive fit connection between the pipe connecting piece and the cover; and
    a latch received in the positive fit pocket, the latch opposed in the first axial direction by the radially outwardly oriented collar such that the radially outwardly oriented collar defines an axial stop in the first axial direction for securing the pipe connecting piece.

2. The filter device according to claim 1, wherein the radially inward oriented segment is fixedly connected onto the cover such that the radially inward oriented segment cannot be lost or detached from the cover.

3. The filter device according to claim 2, wherein the radially inward oriented segment is permanently fixed to the cover by one of: welding, soldering, beading, or gluing.

4. The filter device according to claim 1, further including:
    a centering element configured to receive the pipe connecting piece is provided on one of the end disks of the hollow cylindrical filter element.

5. The filter device according to claim 1, wherein the cover and the filter housing are permanently fixed together as one piece.

6. The filter device according to claim 1, wherein the filter device is configured and adapted as a disposable filter.

7. The filter device according to claim 1, wherein the pipe connecting piece has a common housing in which
    a supply channel is arranged; and
    a discharge channel in arranged;
    wherein the supply channel supplies unfiltered fluid; and
    wherein the discharge channel conveys away filtered fluid.

8. The filter device according to claim 7, wherein the supply channel and the discharge channel are arranged coaxially.

9. The filter device according to claim 8, wherein the supply channel annularly surrounds the discharge channel.

10. The filter device according to claim 1, further comprising:
    at least one non-return valve integrated into the pipe connecting piece.

11. The filter device according to claim 1, further comprising:
    a pressure control valve, the pipe connecting piece including a return channel into which the pressure control valve is integrated.

12. The filter device according to claim 1, further comprising:
    an air vent screw integrated into the pipe connecting piece.

13. The filter device according to claim 1, wherein:
    the latch is disposed adjacent a radially outward side of the axially extending segment; and
    the sealing element is disposed adjacent a radially inward side of the axially extending segment.

14. A filter device for filtering a fluid, comprising:
    a filter housing;
    a cover arranged on the filter housing;
    a sealing element;
    a hollow cylindrical filter element inserted into an interior of the filter housing, the hollow cylindrical filter element including:
        a filter medium for filtering the fluid,
        end disks on opposing end faces of the filter medium, a first end disk of the end disks having a flow opening extending through the first end disk;
    an axially extending segment extending in a first axial direction from the cover, the axially extending segment delimiting a sealing pocket in an outward radial direction, the sealing pocket receiving the sealing element;
    a radially inwardly oriented segment extending from the axially extending segment and delimiting the sealing pocket in the first axial direction; and
    a radially outwardly oriented collar extending outwardly from the axially extending segment;
    wherein the radially inwardly oriented segment delimits a central opening on the cover;
    wherein the filter device further comprises a centering element arranged on the first end disk, the centering element axially extending through the central opening on the cover delimited by the radially inwardly oriented segment.

\* \* \* \* \*